July 28, 1959  A. V. OSBORNE  2,896,928
FRACTIONATING COLUMN
Original Filed Jan. 23, 1956  2 Sheets-Sheet 1
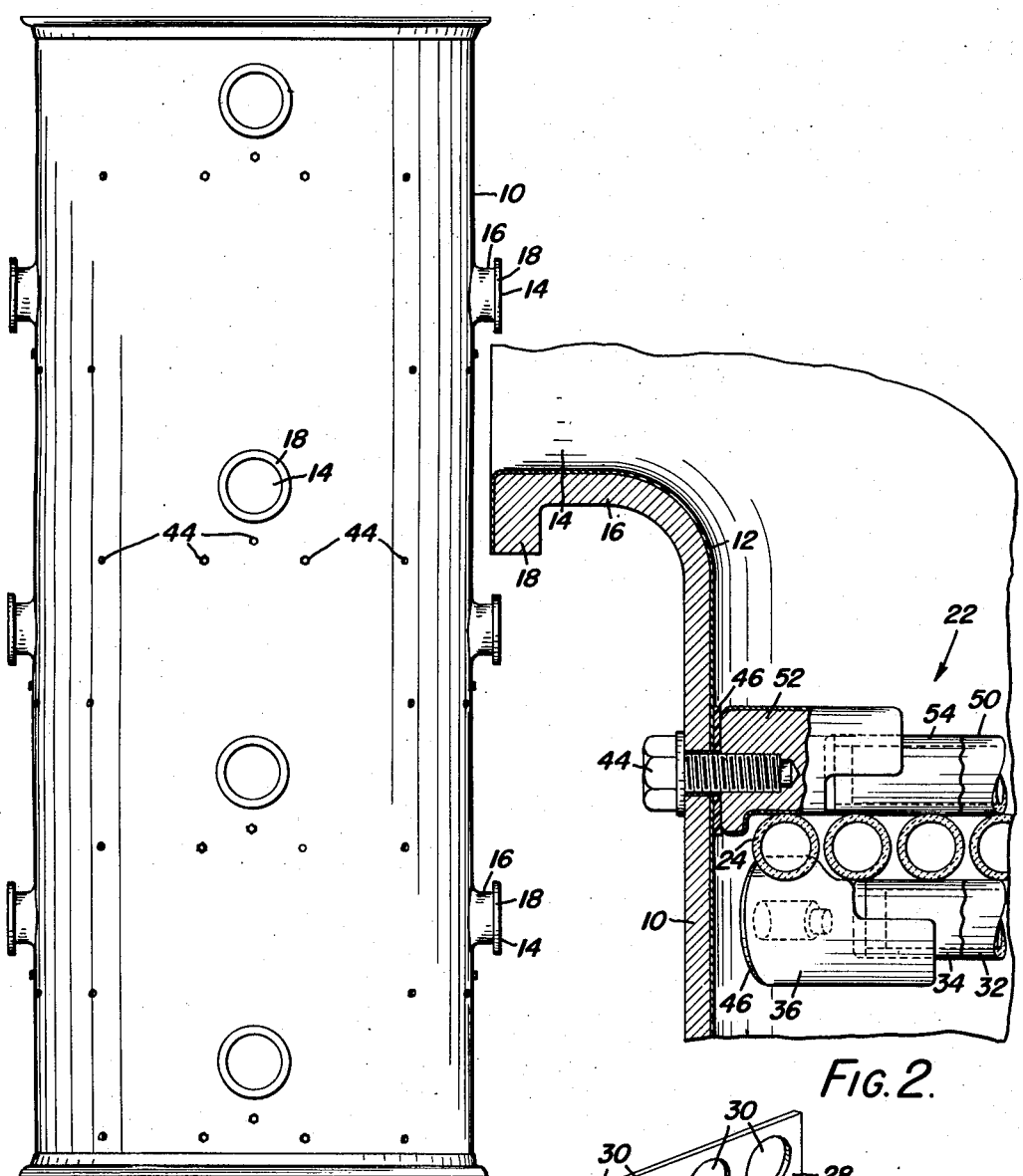
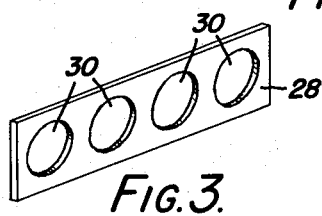
INVENTOR.
ALEC V. OSBORNE
BY
*Edward H. Lumpston*
HIS ATTORNEY July 28, 1959     A. V. OSBORNE     2,896,928
FRACTIONATING COLUMN
Original Filed Jan. 23, 1956     2 Sheets-Sheet 2
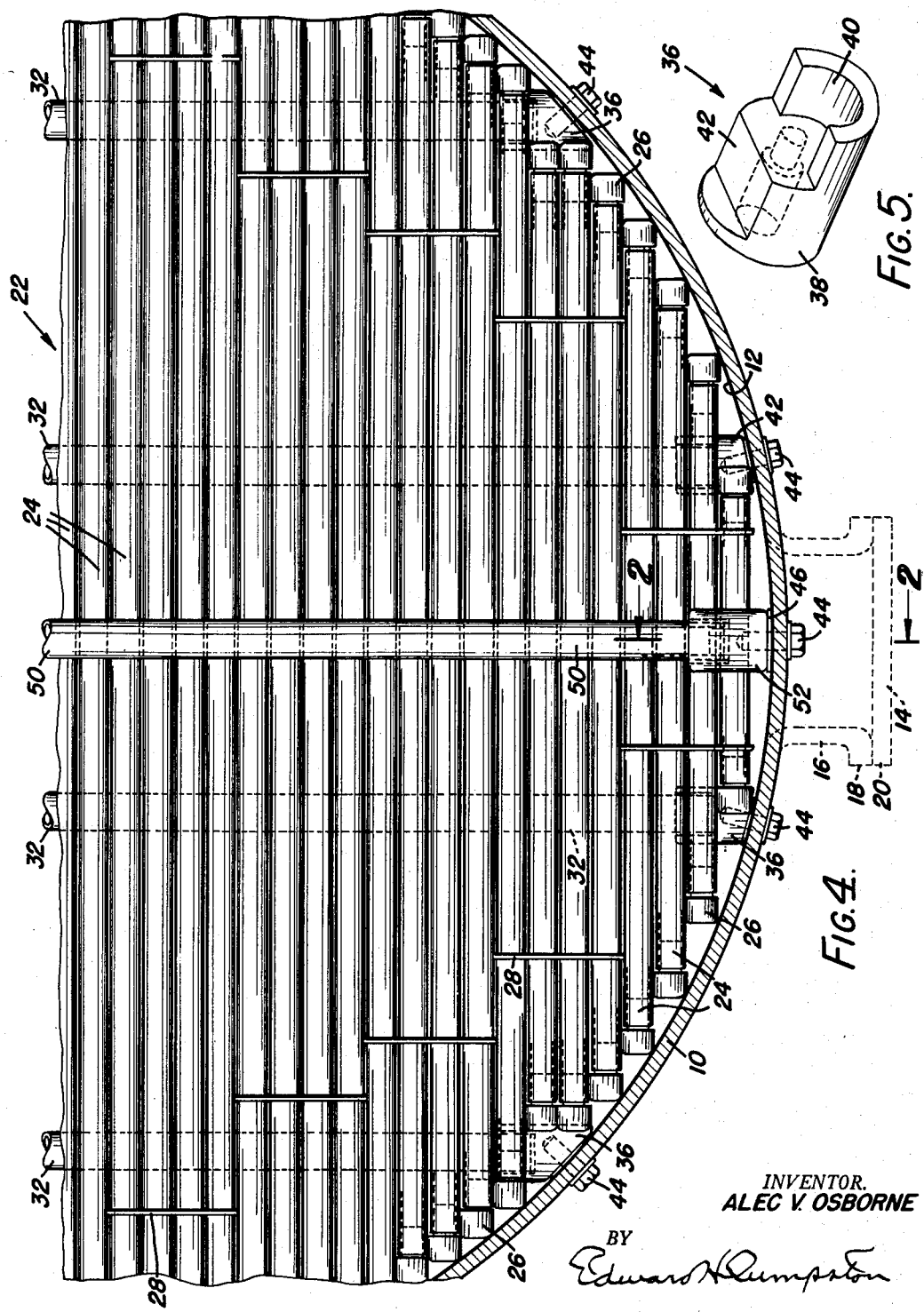
INVENTOR.
ALEC V. OSBORNE
BY
*Edward H. Lumpston*
HIS ATTORNEY

United States Patent Office 2,896,928
Patented July 28, 1959

2,896,928
FRACTIONATING COLUMN

Alec V. Osborne, Mexico City, Mexico, assignor to Pfaudler Permutit Inc., Rochester, N.Y., a corporation of New York Continuation of abandoned application Serial No. 560,582, January 23, 1956. This application February 21, 1958, Serial No. 716,737

5 Claims. (Cl. 261—113)

This invention relates to fractionating columns and more particularly to fractionating columns adapted for handling corrosive materials, one object of the invention being the provision of a more efficient column of this nature.

In certain industries, it is often necessary to rectify or fractionate certain corrosive materials, particularly acids which have a highly deleterious effect on the materials commonly used for construction of fractionating columns or towers. In the past, it has been the practice to make such apparatus from one or more of the corrosion resistant materials such as stainless steel and the like, but this has proven to be extremely costly. For this reason, another object of the invention is the provision of a column of relatively inexpensive steel construction which is protected from corrosive effects by an internal vitreous enamel or glass lining.

In the past certain difficulties have been encountered in the construction of the internal parts of fractionating columns designed for corrosion resistant use. The common "bubble cap" type of tray has proven efficient in service, but such devices are expensive when manufactured from corrosion resistant material. Slat or bar type column trays are less expensive to manufacture, but have proven vulnerable to the effects of corrosion. It is therefore another object of this invention to provide an inexpensive slat or bar type tray for rectifying columns which are corrosion resistant.

It is well known that glass is one of the most corrosion resistant materials particularly under acidic conditions. For this reason, a further object of this invention is the provision of fractionating columns having trays formed of glass.

Since bars or slats formed of glass are somewhat fragile, it is necessary to provide means of support adapted to the peculiar properties of this material, and to provide cushioning means for protecting the glass parts from mechanical shock, and the provision of such supporting and cushioning means is a further object of this invention.

Fractionating columns are large and bulky pieces of apparatus, and they are generally erected and assembled at the site of use. For this reason, it is desirable to provide supporting and cushioning means for the internal glass parts which may easily be assembled and installed in the field, and the provision of such means is a further object of this invention.

In the maintenance of columns of this type, it is often necessary to clean, condition, or replace the internal parts thereof, and to this end it is often necessary to remove and replace one or more of the slats or bars constituting the trays. For this reason, it is desirable to provide supporting means which may easily be dismantled and reassembled in the field and which permits the removal and replacement of any one of the glass bars without disturbing the remainder of the tray involved, and the provision of such supporting means is a still further object of this invention.

Other objects of this invention include the provision of a column of the above description which is efficient, economical to manufacture from standard parts, and practical to erect and maintain in the field.

This application is a continuation of the co-pending application of Alec V. Osborne, Serial No. 560,582, filed January 23, 1956, now abandoned.

To these and other ends the invention resides in certain improvements and combinations of parts, all as will be hereinafter more fully described, the novel features being pointed out in the claims at the end of the specification.

In the drawings:
Fig. 1 is a side elevation of a fractionating tower embodying this invention;
Fig. 2 is an enlarged cross sectional view taken along lines 2—2 in Fig. 4;
Fig. 3 is a perspective view of a spacer removed for purposes of clarity;
Fig. 4 is a fragmentary enlarged top plan view of a fractionating tray; and
Fig. 5 is an enlarged perspective view of a saddle bracket removed for purposes of clarity.

A fractionating column embodying this invention, and here shown for the purpose of illustration, preferably comprises a vertical cylindrical outer shell 10, shown in Fig. 1, supporting a plurality of fractionating trays. Shell 10, which may be of any desired height, is preferably fabricated of mild steel or some other suitable material protected by a layer of glass or vitreous enamel 12 (Figs. 2 and 4) in order to withstand the corrosive effects of material treated. Access to the interior of the shell and to the several trays is provided by a plurality of vertically spaced manholes or ports 14 each comprising an outwardly extending pipe portion 16 (Fig. 2) terminating in a flange 18. Ports 14 are closed by cover plates 20 (Fig. 4) or other suitable removable closures. Alternate ones of ports 14 are offset by 90° for purposes hereinafter described.

A plurality of vertically spaced horizontal trays 22 are mounted in shell 10, each tray being adjacent to and slightly below a port 14, as shown in Fig. 2. Each of trays 22 comprises a lattice structure consisting of a series of spaced, parallel cylindrical bars or tubes 24, supported in a horizontal plane. The tubes of each tray extend in a direction substantially perpendicular to the axis of the adjacent port 14, and thus the tubes of each alternate tray are disposed at right angles to the tube of the adjacent upper and lower trays.

Tubes 24 are formed of chemically resistant glass or other suitable corrosion resistant material cut to length and protected at the end by tips 26 (Fig. 4) preferably fabricated of "Teflon" or other suitable, chemically resistant material which will be unaffected by the contents of the column, and which is soft and resilient enough to form a protective cushion. Tips 26 are preferably made in the form of plugs fitting into the ends of tubes 24 and have enlarged, rounded heads which abut the glass walls of the container.

In order to assure the efficient functioning of this type of fractionating column, it is necessary that the tubes comprising the trays be accurately spaced to provide for uniform liquid and vapor flow at all areas of the tray. In order to accomplish this, the tubes are held at predetermined accurately spaced intervals by transversely extending spacers 28 (Figs. 3 and 4). Spacers 28 preferably comprise rectangular plates of resilient plastic material containing a plurality of accurately spaced holes 30. Spacers 28 are slipped over a group of tubes, thereby fastening the tubes into bundles which are accurately held in the desired spaced relationship. One spacer is preferably used at each end of every bundle of tubes to assure accurate spacing of the tubes along the entire length of the bundle. The length of each spacer is accurately adjusted in relation to the diameter of the tubes and to the position of the holes so that the projecting ends of the spacer abut the outer tubes of the adjacent bundles to maintain the desired spacing between bundles. Thus, when each bundle of tubes is inserted and forced against the adjacent bundles, the spacing of all the tubes will be uniform across the entire area of the plate.

Tubes 22 are supported by a series of transverse supporting members 32 preferably comprising heavy glass tubes or other suitable members, of a diameter somewhat larger than that of the tubes 24 described above. The surfaces of transverse members 32 are preferably covered with a thin sheath or envelope 34 of a soft, resilient plastic such as "Teflon" or other inert material in order to provide a cushioned support for glass tubes 24. Transverse members 32 are supported by a series of saddle brackets 36 (Figs. 2, 4 and 5) which are preferably composed of steel or other suitable metallic alloy protected by a coating of glass or vitreous enamel. Saddles 36 comprise a generally cylindrical body portion 38 (Fig. 5) terminating in a semi-cylindrical saddle or socket support 40 for containing the ends of the cylindrical supporting members 32. The other end of body portion 38 is cut at an angle conforming with the angle of the shell at the point where the particular bracket is to be used. Thus, the saddle bracket designed for use at the center of the column has a substantially square end while the brackets designed for use at the sides of the cylindrical shell have their ends cut at angles corresponding to the curvature of the shell, so that they may squarely abut the shell to form a firm seat therewith as shown in Fig. 4. The top surface of body 38 may be cut away as at 42 (Fig. 5), to provide clearance for the outer tube 24, as shown in Fig. 4. The outer end of body 38 is drilled and threaded for the reception of a bolt 44 which is inserted from the outside of shell 10 to hold the bracket firmly in place against the interior wall of the shell. A gasket 46 (Fig. 2) of a suitably resilient chemically resistant material is interposed between the end of body portion 38 and the shell to cushion the interior wall of the shell, to seal the joint therebetween, and to take up the gap between the curved shell and the planar end of the body.

The tubes comprising each tray are held in place on the supports by a transversely extending locking member 50 (Fig. 2) which is similar to supporting members 32 and preferably of glass but which is placed on top of tubes 24 in order to hold the latter in place against vertical movement. This member is held in place by inverted saddle brackets 52 similar to saddle brackets 36. Locking member 50 is also protected by a thin envelope of plastic 54 similar to envelope 34 covering supporting tubes 32, in order to prevent glass to glass contact.

In practice, outer shell 10 is fabricated, the glass lining is applied, the holes for bolts 44 are drilled, and glass coated saddle brackets 36 are installed and bolted in position at the factory. Tubes, 24, 32 and 50, are cut to length, and are packed separately.

After shell 10 has been set up at the site of use and carefully leveled, the supporting members 32 are laid into place in saddles 36 through the adjacent ports 14. Tubes 24 are then assembled into bundles by means of spacers 28, and are laid into place on supporting members 32. Locking members 50 are then inserted and fastened in place by means of brackets 52 which are bolted to shell 10. When all the trays have been inserted as described above, ports 14 are sealed by means of closure plates 20, and the column is ready for operation. If, during the course of use, it should become necessary to clean the trays or to replace one or more of the tubes, the appropriate port 14 is opened, one or both saddle brackets 52 are removed, locking member 50 is removed and the desired tubes 24 are then removed and replaced. Since tubes 24 are securely supported by means of supporting members 32, any desired tube or bundle of tubes may be removed without disturbing the other tubes of the tray. Thus, maintenance and replacement of the column in the field is a very simple matter and may be accomplished with the minimum of disassembly. Thus, the invention accomplishes its stated objects. It provides a completely corrosion resistant fractionating column having corrosion resistant glass trays. Any portion of these trays are quickly and easily removable in the field, and since each element of the tray is independently supported by transverse supporting members, any single tube or bundles of tubes may be removed without disturbing the adjacent tubes or bundles of tubes as the case may be.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A fractionating column comprising a glass-lined metallic shell having a plurality of access providing manholes spaced vertically and circumferentially from one another therein, and a plurality of fractionating tray units spaced vertically from one another in said shell and each comprising a plurality of supporting brackets of corrosion-resisting material fixed to said shell below an adjacent manhole, a plurality of transversely extending, supporting rods of corrosion-resisting material removably supported by said brackets, a plurality of closely spaced, parallel, tray-forming rods of corrosion-resisting material extending transversely of and removably supported by said supporting rods, a pair of upper brackets of corrosion-resisting material fixed to said shell at opposite sides thereof and a rod of corrosion-resisting material removably supported by said upper brackets for holding said tray-forming rods on said supporting rods.

2. A fractionating column comprising a glass-lined metallic shell having a plurality of access providing manholes spaced vertically and circumferentially from one another therein and a plurality of fractionating tray units spaced vertically from one another in said shell, and each comprising a plurality of glass-coated metal supporting brackets fixed to said shell below an adjacent manhole, a plurality of transversely extending glass rods removably supported by said brackets, a plurality of closely spaced, parallel, tray-forming glass rods extending transversely of and removably supported by said supporting rods, means for holding said tray-forming rods in parallel spaced relation to one another, a pair of upper glass-coated metal brackets fixed to said shell at opposite sides thereof and a glass rod removably supported by said upper brackets for holding said tray forming rods on said supporting rods, said supporting and holding rods having coatings thereon of corrosion-resisting cushioning material to prevent glass-to-glass contact with said tray-forming rods.

3. A fractionating column comprising a cylindrical glass-lined metallic shell having a plurality of pairs of oppositely arranged access providing manholes, with said pairs spaced vertically and circumferentially from one another therein, a plurality of fractionating tray units in said shell each adjacent and below a pair of said manholes and each comprising a pair of supporting brackets of corrosion-resisting material fixed to said shell on opposite sides of each manhole and accessible therethrough, a pair of horizontally extending supporting rods of corrosion-resisting material removably supported by said brackets, a plurality of closely spaced, parallel, tray-forming rods of corrosion-resisting material extending transversely of and removably supported by said supporting rods, means for holding said tray-forming rods in parallel, spaced relation with one another, a pair of upper brackets of corrosion-resisting material fixed to said shell above said tray-forming rods and a rod of corrosion-resisting material removably supported by said upper brackets for holding said tray-forming rods on said supporting rods, all of said rods being removable through the adjacent man-holes.

4. In a fractionating column for corrosive materials having a containing and supporting shell, the combination of a plurality of spaced pairs of supporting brackets of corrosion-resisting material adapted for attachment to said shell and having sockets therein, a plurality of horizontally extending supporting rods of corrosion-resisting material having their ends removably supported in the sockets of said brackets, a plurality of closely spaced, parallel tray-forming rods of corrosion-resisting material extending transversely of and removably supported by said supporting rods, a pair of upper brackets of corrosion-resisting material adapted for attachment to said shell above said tray-forming rods and having sockets therein, and a rod of corrosion-resisting material removably supported in the sockets of said upper brackets and holding said tray-forming rods on said supporting rods.

5. In a fractionating column for corrosion-resisting materials having a containing and supporting shell, the combination of a plurality of spaced pairs of glass-coated metallic supporting brackets adapted for attachment to said shell and having sockets therein, a plurality of horizontally extending, glass supporting rods having their ends removably supported in the sockets of said brackets, a plurality of closely spaced, parallel, tray-forming glass rods extending transversely of and removably supported by said supporting rods, a pair of upper glass-coated metallic brackets adapted for attachment to said shell above said tray-forming rods and having sockets therein, means for holding said tray-forming rods in parallel, spaced relation with one another and a glass rod removably supported in the sockets of said upper brackets and holding said tray-forming rods on said supporting rods, said supporting rods and said rod for holding said tray-forming rods having coatings thereon of corrosion-resisting and cushioning material to prevent glass-to-glass contact with said tray-forming rods.

References Cited in the file of this patent

UNITED STATES PATENTS

| | | |
|---|---|---|
| 905,142 | Bond | Dec. 1, 1908 |
| 1,227,019 | Thompson | May 22, 1917 |
| 1,920,623 | Becker | Aug. 1, 1933 |
| 2,396,241 | Besler et al. | Mar. 12, 1946 |
| 2,789,803 | Doty | Apr. 23, 1957 |

FOREIGN PATENTS

| | | |
|---|---|---|
| 135,776 | Great Britain | Dec. 4, 1919 |
| 710,630 | Germany | Sept. 18, 1941 |
| 885,548 | France | May 31, 1943 |

OTHER REFERENCES

Chemical Engineering, vol. 58; issue 2; pages 155–157; February 1951.